(12) United States Patent
Yeung et al.

(10) Patent No.: US 8,222,302 B2
(45) Date of Patent: Jul. 17, 2012

(54) TITANIA-SILICA AEROGEL MONOLITH WITH ORDERED MESOPOROSITY AND PREPARATION THEREOF

(75) Inventors: King Lun Yeung, Hong Kong (CN); Nan Yao, Hong Kong (CN); Shengli Cao, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 1824 days.

(21) Appl. No.: 11/288,859

(22) Filed: Nov. 29, 2005

(65) Prior Publication Data

US 2007/0119344 A1    May 31, 2007

(51) Int. Cl.
*B01J 13/00* (2006.01)
(52) U.S. Cl. .................. 516/100; 106/287.34
(58) Field of Classification Search ............ 516/100; 106/287.34
See application file for complete search history.

(56) References Cited

U.S. PATENT DOCUMENTS

| | | | |
|---|---|---|---|
| 4,432,956 A * | 2/1984 | Zarzycki et al. | 423/338 |
| 5,935,895 A * | 8/1999 | Baiker et al. | 502/349 |
| 6,193,943 B1 * | 2/2001 | Pinnavaia et al. | 423/326 |
| 6,228,340 B1 * | 5/2001 | Imhof et al. | 423/338 |
| 2002/0065366 A1 * | 5/2002 | Wirnsberger et al. | 525/88 |
| 2002/0094426 A1 | 7/2002 | Stepanian et al. | |
| 2004/0180787 A1 | 9/2004 | Rolison et al. | |

FOREIGN PATENT DOCUMENTS

GB    2 356 859 A    6/2001

OTHER PUBLICATIONS

Wang et al., 'Visible light photocatalysis in transition metal incorporated titania-silica aerogel', Accepted Oct. 8, 2003, Applied Catalysis B: Environmental 48 (2004) 151-154.*
Deng et al., "Preparation and photocatalytic activity of TiO2-SiO2 aerogels" NanoStructured Materials, vol. 11, No. 8, pp. 1313-1318, 1999.*
Yoda et al., "TiO2-impregnated SiO2 aerogels by alcohol supercritical drying with zeolite", Journal of Non-Crystalline Solids, 225 (1998), p. 105-110.*

* cited by examiner

*Primary Examiner* — Ling Choi
*Assistant Examiner* — Chun-Cheng Wang
(74) *Attorney, Agent, or Firm* — The Nath Law Group; Jerald L. Meyer; Stanley N. Protigal

(57) ABSTRACT

A $TiO_2$—$SiO_2$ aerogel and $TiO_2$—$SiO_2$ aerogel monolith with a regular and predeterminable shape and an ordered mesoporosity and a method of making the aerogel and aerogel monolith, using surfactants in preparing the $SiO_2$ sol before mixing with $TiO_2$ sol. The aerogel obtained by this method has a specific surface area greater than 400 $m^2/g$ and a pore volume larger than 0.5 cc/g.

20 Claims, 9 Drawing Sheets

TITANIA-SILICA AEROGEL MONOLITH WITH ORDERED MESOPOROSITY AND PREPARATION THEREOF

FIELD OF THE INVENTION

The present invention relates to $TiO_2$—$SiO_2$ aerogel and the process of producing it. Particularly, it relates to a free-standing monolithic $TiO_2$—$SiO_2$ aerogel with an ordered mesoporosity.

BACKGROUND OF THE INVENTION

Aerogel is a solid with a porous, sponge-like structure in which about 95% of the volume is empty space (that is, filled with air). Aero gels are therefore unique among solid materials. They possess extremely low densities, large open pores, and a large inner surface area. Discovered in the 1930s, aerogel is believed to be the world's lightest solid.

Aerogel thus possesses interesting physical and chemical properties including extremely low thermal conductivity, low sound velocity combined with excellent thermostability and mechanical properties. For silica aerogel, it also possesses high optical transparency. Currently, the aerogel materials are widely applied in the catalytic reactions, aerospace technology (storage, thickening or transport of rocket fuels and consisting of outside layer of spacecraft), advanced materials and so on. For example, Monsanto once produced aerogel granules made of silica for use as additives in cosmetics and toothpastes. NASA has used aerogels as insulation on the Mars Sojourner robot and as a medium to capture pure star dust, which was then returned to Earth for study.

Generally, the aerogels are prepared from molecular precursors via sol-gel method and following supercritical drying processing to exchange the pore liquid with air while maintaining the filigrane solid network. (Gesser, H. D.; Goswami, P. C. Chem. Rev., 89, (1989), 765.; Hüsing, N.; Schubert, U. Angew. Chem. Int. Ed., 37, (1998), 22.; Pierre, A. C.; Pajonk, G. M. Chem. Rev., 102, (2002), 4243.) By increasing the temperature and the pressure on the gel so that the liquid inside becomes "supercritical," a special state in which a material has some properties of a liquid and some properties of a gas. Interestingly, supercritical liquid, like a gas, has practically no surface tension. The surface tension is believed to be the reason that causes collapse of the scaffolding made of the tiny network inside the gel as the liquid evaporates.

With the above basic approach, it is no longer difficult to make aerogels. Aerogels generally assume two physical forms: powder form (without defined shape) and monolithic form (with defined shapes). While it is relatively easy to make monolithic aerogels which are predominantly based on $SiO_2$, there is no known easy procedure to make monolithic aerogels out of material that contains a substantial amount of non $SiO_2$ components. In addition, aerogels tend to have a broad pore size distribution. Aerogels that are not purely made from $SiO_2$ are useful for many applications, for example, for embedding catalysts therein for increasing catalytic efficiency due to aerogels' large surface-mass ratio wherein monolithic aerogels are advantageous than aerogel in powder form. The monolithic form prevents the nanoparticles from delamination, in particular, in the field of indoor air quality control by gas-phase photocatalytic oxidation reaction. Furthermore, catalysts embedded in monolithic aerogel help to overcome the practical drawbacks of the fine powders, including the difficult separation and handling for liquid-phase reactions or large pressure drops for gas phase reactions. Therefore, there is a great need for developing aerogel monolith not purely based on $SiO_2$ as well as novel procedures to make such aerogel monolith easily and economically.

SUMMARY OF THE INVENTION

Accordingly, an object of the present invention is to provide a monolithic $TiO_2$—$SiO_2$ aerogel and a method of fabricating thereof. A further object of the present invention is to provide a $TiO_2$—$SiO_2$ aerogel which has an ordered mesoporosity.

In order to achieve these and other objects of the invention, a $TiO_2$—$SiO_2$ aerogel according to one aspect of the present invention has the following features: (1) containing at least 0.1% w/w of titania, preferably 1%-99%, most preferably 5%-50%; (2) having an ordered mesoporosity, with pore diameters varying between 2-50 nm; and (3) a regular shape, which may be any defined 3-dimensional shapes with a plurality of flat or curved surfaces, such as sphere, pyramid, cube, elongated cube, cylinder, sheet object with a predetermined thickness, etc.

According to another aspect of the invention, in the $TiO_2$—$SiO_2$ aerogel between 5% and 50% of the titania is in the form of titanium dioxide crystals, and at least 50%, preferably 80%, of the titanium dioxide crystals have a size between about 3 nm and about 25 nm and a crystallinity greater than 70%.

According to another aspect of the invention, the $TiO_2$—$SiO_2$ aerogel includes a Ti—O—Si bond, which is characterized by an absorption peak around 960 $cm^{-1}$ in the infrared spectrum.

According to another aspect of the invention, the $TiO_2$—$SiO_2$ aerogel has a specific surface area greater than 200 $m^2/g$, preferably greater than 400 $m^2/g$, and a pore volume larger than 0.25 cc/g, preferably larger than 0.5 cc/g.

According to another aspect of the invention, in the $TiO_2$—$SiO_2$ aerogel at least 65% of said titanium dioxide crystals are substantially pure anatase, brookite or rutile.

As another aspect of the present invention, there is provided a process for fabricating a $TiO_2$—$SiO_2$ aerogel monolith, which includes the following step:

a) forming a titanium dioxide sol with particle size of about 3 nm-25 nm, preferably, by hydrolyzing a titanium dioxide precursor in the presence of alcohol and water and then peptizing using an acid, which can be, for example, $HNO_3$, $H_2SO_4$, HCL or $H_3PO_4$; other acids may also provide satisfactory results; alternatively, the titanium dioxide sol is prepared by mixing an organic modifier (such as, for example, ketone) with a titanium dioxide precursor, such as titanium isopropoxide, at a molar ratio ranging from 1:10 to 10:1;

b) forming a silica sol with particle size of about 3 nm-25 nm (as measured by AFM), preferably by hydrolyzing a silica precursor, such as, for example, tetraethyl orthosilicate or tetramethyl orthosilicate, in the presence of alcohol and water and then peptizing using an acid, which can be, for example, $HNO_3$, $H_2SO_4$, HCL or $H_3PO_4$; other acids may also provide satisfactory results;

c) optionally adding one or more surfactants to said silica sol to form a mixture where said surfactant or surfactants account for 50%-70% by weight, wherein the surfactant or surfactants can be one or more of long chain organic ammonium salt, amphiphilic block copolymer, cetyltrimethyl ammonium salt, and poly(ethylene oxide)-poly(propylene oxide)-poly(ethylene oxide), preferably cetyltrimethyl ammonium bromide or poly(ethylene oxide)-poly(propylene oxide)-poly(ethylene oxide);

d) mixing the titanium dioxide sol with the silica sol of step (2) or with the mixture of step (c) to afford a $TiO_2$—$SiO_2$ sol;

e) transferring an amount of $TiO_2$—$SiO_2$ sol into a mold, which can be of any suitable shapes;

f) allowing said $TiO_2$—$SiO_2$ sol to undergo a gelation process to afford an alcogel;

g) drying said alcogel under supercritical conditions to afford an aerogel.

h) calcining the aerogel to afford final $TiO_2$—$SiO_2$ aerogel monolith with a regular shape predetermined through the design of the mold in step (e).

It is understood that one or more features according to various aspects of the present invention may be present in a particular embodiment of the invention and the particular embodiment may not necessarily possess all the features listed above.

The various features of novelty which characterize the invention are pointed out with particularity in the claims annexed to and forming a part of this disclosure. For a better understanding of the invention, its operating advantages, and specific objects attained by its use, reference should be made to the drawings and the following description in which there are illustrated and described preferred embodiments of the invention.

DETAILED DESCRIPTION OF THE PREFERRED EMBODIMENT

Preparation of $TiO_2$—$SiO_2$ Aerogel Monolith

Figure 1:
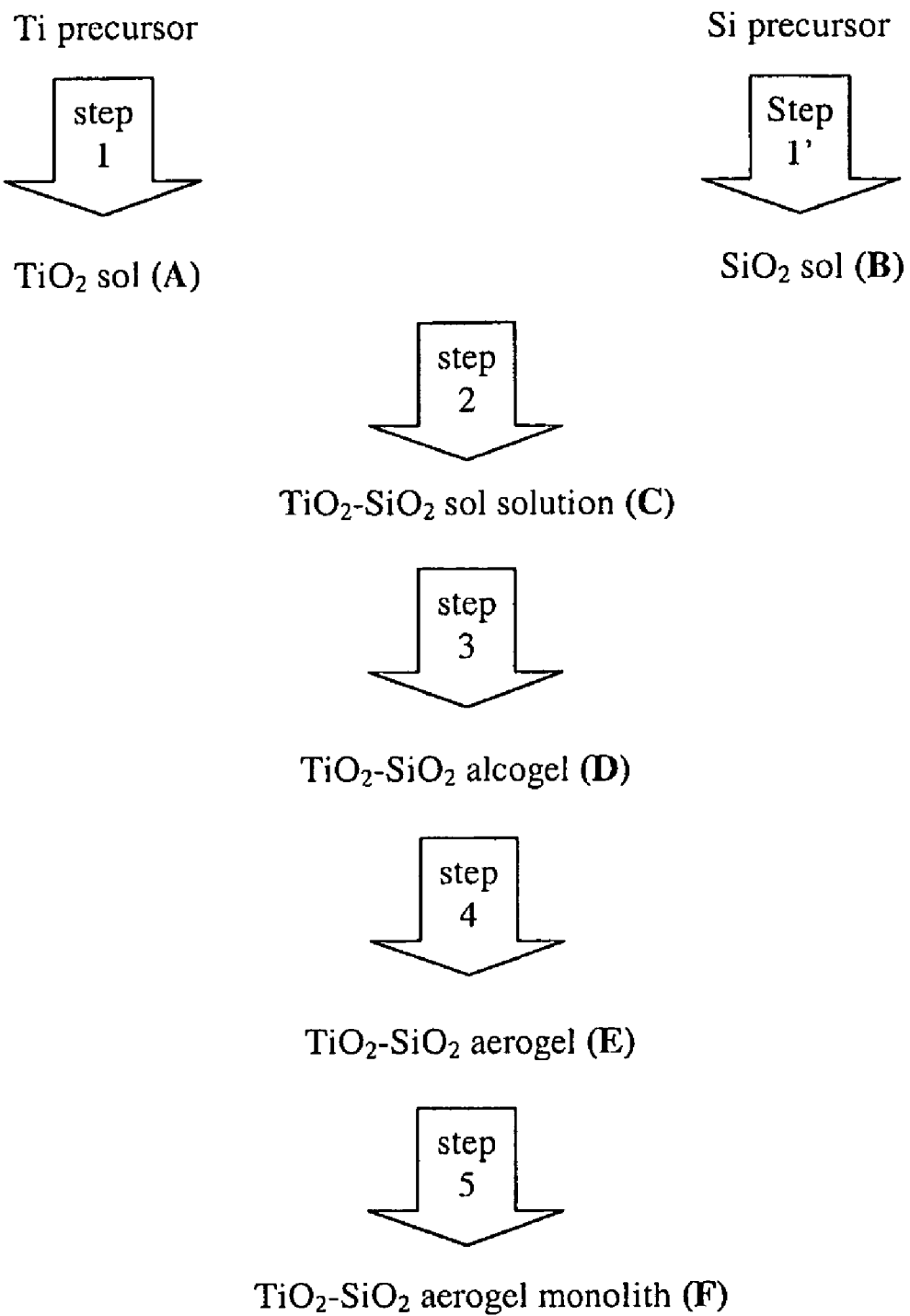
FIG. 1 is a schematic diagram illustrating the steps for making $TiO_2$—$SiO_2$ aerogel monolith samples of the present invention.

FIG. 1 is a schematic diagram illustrating the process for making $TiO_2$—$SiO_2$ aerogel monolith samples as one particular embodiment of the present invention. As shown, the process can be divided into 5 steps. Step 1 involves hydrolysis and peptization to produce a stable titanium dioxide sol (A) where a solution of precursor (for example, titanium isopropoxide) and alcohol (e.g. ethanol) are mixed with distilled deionized water and nitric acid. In the parallel step 1', a stable $SiO_2$ sol (B) is produced by the acidic hydrolysis of a mixture containing a predetermined molar ratio of TEOS, $H_2O$, $HNO_3$, ethanol and surfactant. In step 2, (A) and (B) are mixed to obtain a $TiO_2$—$SiO_2$ sol (C). In step 3, a predetermined amount of $TiO_2$—$SiO_2$ sol (C) is placed in a mold with a desired shape and stay without agitation for a period of time until gelation occurs, whereby forming an alcogel (D). In step 4, the ethanol or $CO_2$ supercritical drying is performed to prepare $TiO_2$—$SiO_2$ aerogel (E), which is further calcined in step 5 to yield the final $TiO_2$—$SiO_2$ aerogel monolith (F).

The following are detailed descriptions of the embodiment with relevant specifics, which are provided as example only and may be varied through routine optimization by those with ordinary skill in the art.

I. Preparation of $TiO_2$ sol (A):

1) 4 ml of TIP (titanium isopropoxide, 98%) was added into 60.8 ml of ethanol (99.9%) solution and stirred for 10 min. Other titanium compounds may also be used to prepare $TiO_2$ sol, such as, for example, titanium (IV) butoxide, titanium ethoxide, titanium methoxide and titanium stearate. n-butanol may replace ethanol and provide satisfactory results.

2) 1 ml of nitric acid (2.3M) was then used for peptization of the above TIP solution to prepare stable and clear $TiO_2$ sol (A) in a process in which titanium isopropoxide hydrolyzed to form a mixture of $(TiO_x(OH)_y)$ where X=2–0, Y=4–2X.

II. Preparation of $SiO_2$ Sol (B'):

1) TEOS (tetraethyl orthosilicate, 98%), distilled deionized water, $HNO_3$ and ethanol were mixed according to a molar ratio of 1:8:0.08:3.8 and stirred vigorously.

2) The solution was refluxed at 55° C. for 6 hours to obtain clear $SiO_2$ solution (B').

III. Preparation of Surfactant Incorporated $SiO_2$ Sol (B)

1) TEOS (tetraethyl orthosilicate, 98%), distilled deionized water, $HNO_3$ and ethanol were mixed according to a molar ratio of 1:8:0.08:3.8 and stirred vigorously.

2) The solution was refluxed at 55° C. for 6 hours to obtain clear $SiO_2$ solution.

3) About 5 g of a surfactant (Pluronic, 123 surfactant $(EO)_{20}(PO)_{70}(EO)_{20}$) was added into above $SiO_2$ and stirred until all the surfactant dissolved completely.

IV. Preparation of $TiO_2$—$SiO_2$ Aerogel Monolith by Ethanol Supercritical Drying:

1) $SiO_2$ sol (B') and $TiO_2$ sol (A) were mixed at a predetermined ratio and stirred for 0.5 hour to obtain a homogeneous $TiO_2$—$SiO_2$ mixed sol (C). The $SiO_2$ sol (B') and $TiO_2$ sol (A) may be mixed at a ratio to achieve a desired titania content, for example, 50%, 10%, 5% of $TiO_2$ by weight in the final monolith. However, other $TiO_2$ percentages may also produce satisfactory results.

2) 5 ml of $TiO_2$—$SiO_2$ sol was transferred into a mold, which had a desired shape.

3) The mold was sealed to prevent organic evaporation.

4) Gelation occurred within several hours or days, depending on the titania content, to form an alcogel (D).

5) The alcogel (D) was removed from the mold and put into a holder.

6) The holder was placed into an autoclave made of 316 stainless steel, and then an excess amount (80 ml) of anhydrous ethanol was added into the autoclave.

7) The autoclave was purged by pure $N_2$ gas with well sealing and then heated to 270-290° C. in 3-5 hours. The final pressure was controlled to 1400-1700 psi by releasing a small amount of ethanol during the heating process.

8) After stabilizing for about half an hour, the ethanol was slowly evacuated at the rate of 500-600 psi/h.

9) When the internal pressure reached ambient pressure, heating was continued for 2-4 hours and then the autoclave was purged by pure $N_2$ gas to drive off the residue ethanol vapor in the system.

10) The autoclave was slowly cooled down to room temperature overnight.

11) The obtained aerogel sample (E) was calcined at 450° C. for 5 hours to produce the aerogel monolith (F).

V. Preparation of Surfactant Incorporated $TiO_2$—$SiO_2$ Aerogel Monolith by Ethanol Supercritical Drying:

The steps involved are substantially the same as those described in IV, except that a surfactant incorporated $SiO_2$ Sol (B) was used in place of a $SiO_2$ sol (B').

VI. Preparation of $TiO_2$—$SiO_2$ Aerogel Monolith by $CO_2$ Supercritical Drying:

1) $SiO_2$ sol (B') and $TiO_2$ sol (A) were mixed at a predetermined ratio and stirred for 0.5 hour to obtain a homogeneous $TiO_2$—$SiO_2$ mixed sol (C). The $SiO_2$ sol (B) and $TiO_2$ sol (A) may be mixed at a ratio to achieve a desired titania content, for example, 50%, 10%, 5% of $TiO_2$ by weight in the final monolith. However, other $TiO_2$ percentages may also produce satisfactory results.

2) 1 ml of $TiO_2$—$SiO_2$ sol was transferred into a mold.

3) A parafilm was used for seal to prevent organic evaporation.

4) Gelation occurred within several hours or days, depending on the titania content, to form an alcogel (D).

5) The formed alcogel was removed from the mold and put into a drying chamber.

6) Liquid $CO_2$ was dosed into the chamber and exchanged with ethanol in the alcogel for several hours or days. During this extraction period, the chamber was refilled with fresh liquid $CO_2$ several times.

7) The chamber temperature was raised to 50° C. in 1-2 hours and then kept at 50° C. for 1 hour.

8) Outlet valve was opened and pressure was slowly released in several hours to ambient pressure.

9) The chamber was slowly cooled down to room temperature overnight.

10) The obtained aerogel sample was calcined at 450° C. for 5 hours to produce the aerogel monolith.

VII. Preparation of Surfactant Incorporated $TiO_2$—$SiO_2$ Aerogel Monolith by $CO_2$ Supercritical Drying:

The steps involved are substantially the same as those described in VI, except that a surfactant incorporated $SiO_2$ sol (B) was used in place of a $SiO_2$ sol (B').

VIII. Basic Synthesis of $TiO_2$—$SiO_2$ Aerogels by Ethanol Supercritical Drying:

1) TMOS-ethanol solution was prepared by dissolving tetramethyl orthosilicate (TMOS, 98%) in ethanol (99.9%) (TMOS:ethanol=1:10.2, molar ratio).

2) $HNO_3$ solution was added into the TMOS-ethanol solution under strong stirring to at least partially hydrolyze TMOS (TMOS:$H_2O$:$HNO_3$=1:2:0.005, molar ratio). The mixture was stirred for 90 minutes at 50° C. to speed up the hydrolysis process, and then cooled down to room temperature.

3) TIP-ethanol solution was prepared by dissolving titanium isopropoxide (TIP, 98%) in ethanol (TIP:ethanol=1:2, molar ratio).

4) A reagent (acetylacetone) was added into the TIP-ethanol solution under strong stirring to adjust the hydrolysis rates of TIP in the presence of water (TIP:reagent=1:1, molar ratio). As heat was generated in this process, the solution was cooled down to room temperature.

5) The TIP solution of step (4) was added into the solution containing partially hydrolyzed TMOS of step (2) under strong stirring (TMOS TIP=1:1, molar ratio). Then, a certain amount of ammonia solution was added into the mixture (TMOS:$H_2O$:$NH_3$=1:4:0.07, molar ratio).

6) An amount of the resulting mixture was transferred into a mold. Gelation occurred after several hours or days to form an alcogel. The alcogel (wet gel) was aged for several days before further treatment.

7) A titania-silica alcogel of step (6) was removed from its mold and put into a holder.

8) The holder was placed into an autoclave made of 316 stainless steel, and then an excess amount of anhydrous ethanol was added into the autoclave to prevent the formation of liquid-gas interface during the heating process.

9) The autoclave was purged by pure $N_2$ gas, then it was sealed and heated to 270-290° in 4-6 hours. The final pressure was controlled to 1400-1700 psi by releasing a small amount of ethanol during the heating process.

10) After staying at 1400-1700 psi for about half an hour, ethanol was slowly evacuated at the rate of 500-600 psi/h.

11) After the internal pressure reached ambient pressure, heating was continued for an additional 2-4 hours and the autoclave was purged by pure $N_2$ gas to drive off the residue ethanol vapor in the system.

12) The autoclave was slowly cooled down to room temperature overnight.

13) The $TiO_2$—$SiO_2$ aerogel could now be taken out of the autoclave.

IX. Basic Synthesis of $TiO_2$—$SiO_2$ Aerogels by $CO_2$ Supercritical Drying:

1) TMOS-ethanol solution was prepared by dissolving tetramethyl orthosilicate (TMOS, 98%) in ethanol (99.9%) (TMOS:ethanol=1:10.2, molar ratio).

2) $HNO_3$ solution was added into the TMOS-ethanol solution under strong stirring to at least partially hydrolyze TMOS (TMOS:$H_2O$:$HNO_3$=1:2:0.005, molar ratio). The mixture was stirred for 90 minutes at 50° C. to speed up the hydrolysis process, and then cooled down to room temperature.

3) TIP-ethanol solution was prepared by dissolving titanium isopropoxide (TIP, 98%) in ethanol (TIP:ethanol=1:2, molar ratio).

4) A reagent (acetylacetone) was added into the TIP-ethanol solution under strong stirring to adjust the hydrolysis rates of TIP in the presence of water (TIP:reagent=1:1, molar ratio). As heat was generated in this process, the solution was cooled down to room temperature.

5) The solution containing TIP of step (4) was added into the solution containing partially hydrolyzed TMOS of step (2) under strong stirring (TMOS:TIP=1:1, molar ratio). Then, an amount of ammonia solution was added into the mixture (TMOS:$H_2O$:$NH_3$=1:4:0.07, molar ratio).

6) An amount of the resulting mixture was transferred into a mold. Gelation occurred after several hours or days to form an alcogel. The alcogel (wet gel) was aged for several days before further treatment.

7) A $TiO_2$—$SiO_2$ alcogel of step (6) was removed from its mold and put into a drying chamber.

8) Liquid $CO_2$ was introduced into the chamber and exchanged with ethanol in the alcogels for several hours or days. During this period, the chamber was refilled with fresh liquid $CO_2$ several times.

9) The chamber temperature was raised to 50° C. in 1-2 hours and then kept at 50° C. for 1 hour.

10) Outlet valve was opened and the pressure was slowly released over a period of several hours to reach ambient pressure.

11) The chamber was slowly cooled down to room temperature overnight.

12) The $TiO_2$—$SiO_2$ aerogel could now be taken out of the chamber.

X. Basic Synthesis of $TiO_2$—$SiO_2$ Aerogels by Hydrothermal Pretreatment and Followed by $CO_2$ Supercritical Drying:

1) Tetramethyl orthosilicate (TMOS, Aldrich, 98%) in ethanol (Merck, 99.9%) was prepared (TMOS:ethanol=1: 10.2, molar ratio).

2) $HNO_3$ solution was added into TMOS-ethanol solution under strong stirring to partially hydrolyze TMOS (TMOS:$H_2O$:$HNO_3$=1:2:0.005, molar ratio). The mixture was stirred for 90 min at 50° C. to speed up the hydrolysis process, and then cooled down to room temperature.

3) Titanium isopropoxide (TIP, ACROS, 98%) in ethanol was prepared (TIP:ethanol=1:2, molar ratio).

4) A reagent (acetylacetone) was added into TIP-ethanol solution under strong stirring to adjust the hydrolysis rates of TIP at the presence of water (TIP:reagent=1:1, molar ratio). Heat was generated in this process and the solution was cooled down to room temperature.

5) The solution containing TIP was added into the solution containing partially hydrolyzed TMOS under strong stirring (TMOS:TIP=1:1, molar ratio). Then, a certain amount of ammonia solution was added into the mixture (TMOS:$H_2O$:$NH_3$=1:4:0.07, molar ratio).

6) The resulting mixture was transferred into molds. Gelation occurred after several hours or days. The alcogel (wet gel) was aged for several days before further treatment.

7) The obtained alcogels (wet gels) were put in a TEFLON liner which was filled with the liquid of $H_2O$/ethanol ($H_2O$:ethanol=1:20, volume ratio). The liner was sealed in a closed SS (stainless steel) container.

8) The SS container was put in a furnace and heated to a certain temperature (e.g., 150° C.). After about 20 hours, the container was taken out of the furnace.

9) The titania-silica alcogels were taken out of the liner and stored in a container filled with pure ethanol before $CO_2$ extraction and supercritical drying.

10) Liquid $CO_2$ was introduced into the chamber and exchanged with ethanol in the alcogels for several hours or days. During this period, the chamber was refilled with fresh liquid $CO_2$ several times.

11) The chamber temperature was raised to 50° C. in 1-2 hours and then kept at 50° C. for 1 hour.

12) Outlet valve was opened and pressure was slowly released in several hours to reach ambient pressure.

13) The chamber was slowly cooled down to room temperature overnight.

14) The $TiO_2$—$SiO_2$ aerogel could be taken out of the chamber.

XI. Basic Synthesis of $TiO_2$—$SiO_2$ Aerogels by Thermal Pretreatment and Followed by $CO_2$ Supercritical Drying:

1) TMOS-ethanol solution was prepared by dissolving tetramethyl orthosilicate (TMOS, 98%) in ethanol (99.9%) (TMOS:ethanol=1:10.2, molar ratio).

2) $HNO_3$ solution was added into TMOS-ethanol solution under strong stirring to at least partially hydrolyze TMOS (TMOS:$H_2O$:$HNO_3$=1:2:0.005, molar ratio). The mixture was stirred for 90 minutes at 50° C. to speed up the hydrolysis process, and then cooled down to room temperature.

3) TIP-ethanol solution was prepared by dissolving titanium isopropoxide (TIP, 98%) in ethanol (TIP:ethanol=1:2, molar ratio).

4) A reagent (acetylacetone) was added into the TIP-ethanol solution under strong stirring to adjust the hydrolysis rates of TIP in the presence of water (TIP:reagent=1:1, molar ratio). As heat was generated in this process, the solution was cooled down to room temperature.

5) The solution containing TIP of step (4) was added into the solution containing partially hydrolyzed TMOS of step (2) under strong stirring (TMOS:TIP=1:1, molar ratio). Then, a certain amount of ammonia solution was added into the mixture (TMOS:$H_2O$:$NH_3$)=1:4:0.07, molar ratio).

6) An amount of the resulting mixture was transferred into a mold. Gelation occurred after several hours or days to form an alcogel. The alcogel (wet gel) was aged for several days before further treatment.

7) The obtained $TiO_2$—$SiO_2$ alcogel of step (6) was put in a TEFLON liner filled with pure ethanol. The liner was sealed in a closed SS (stainless steel) container.

8) The SS container was put in a furnace and heated to a certain temperature (e.g., 200° C.). After 10 hours, the container was taken out of the furnace.

9) The $TiO_2$—$SiO_2$ alcogels were taken out of the liner and stored in a container filled with pure ethanol before $CO_2$ extraction and supercritical drying.

10) Liquid $CO_2$ was introduced into the chamber and exchanged with ethanol in the alcogels for several hours or days. During this period, the chamber was refilled with fresh liquid $CO_2$ several times.

11) The chamber temperature was raised to 50° C. in 1-2 hours and then kept at 50° C. for one hour.

12) Outlet valve was opened and the pressure was slowly released over a period of several hours to reach ambient pressure.

13) The chamber was slowly cooled down to room temperature overnight.

14) The $TiO_2$—$SiO_2$ aerogel could now be taken out of the chamber.

XII. Basic Synthesis of $TiO_2$—$SiO_2$ Aerogels by Microwave Pretreatment and Followed by $CO_2$ Supercritical Drying:

1) TMOS-ethanol solution was prepared by dissolving tetramethyl orthosilicate (TMOS, 98%) in ethanol (99.9%) (TMOS:ethanol=1:10.2, molar ratio).

2) $HNO_3$ solution was added into TMOS-ethanol solution under strong stirring to at least partially hydrolyze TMOS (TMOS:$H_2O$:$HNO_3$=1:2:0.005, molar ratio). The mixture was stirred for 90 minutes at 50° C. to speed up the hydrolysis process, and then cooled down to room temperature.

3) TIP-ethanol solution was prepared by dissolving titanium isopropoxide (TIP, 98%) in ethanol (TIP:ethanol=1:2, molar ratio).

4) A reagent (acetylacetone) was added into the TIP-ethanol solution under strong stirring to adjust the hydrolysis rates of TIP in the presence of water (TIP:reagent=1:1, molar ratio). As heat was generated in this process, the solution was cooled down to room temperature.

5) The solution containing TIP of step (4) was added into the solution containing partially hydrolyzed TMOS of step (2) under strong stirring (TMOS:TIP=1:1, molar ratio). Then, an amount of ammonia solution was added into the mixture (TMOS:$H_2O$:$NH_3$=1:4:0.07, molar ratio).

6) The resulting mixture was transferred into molds. Gelation occurred after several hours or days. The alcogel (wet gel) was aged for several days before further treatment.

7) The obtained alcogels of step (6) were put in a TEFLON liner which was filled with the mixture of $H_2O$/ethanol ($H_2O$:ethanol=1:20, volume ratio). The liner was sealed in a closed TEFLON container.

8) The TEFLON container was put in a microwave oven and heated at 70 W for 2 hours.

9) The $TiO_2$—$SiO_2$ alcogels were taken out of the liner and stored in a container filled with pure ethanol before subsequent $CO_2$ extraction and supercritical drying.

10) Liquid $CO_2$ was introduced into the chamber and exchanged with ethanol in the alcogels for several hours or days. During this period, the chamber was refilled with fresh liquid $CO_2$ several times.

11) The chamber temperature was raised to 50° C. in 1-2 hours and then kept at 50° C. for 1 hour.

12) Outlet valve was opened and the pressure was slowly released in several hours to reach ambient pressure.

13) The chamber was slowly cooled down to room temperature overnight.

14) The $TiO_2$—$SiO_2$ aerogel could now be taken out of the chamber.

Properties of the $TiO_2$—$SiO_2$ Aerogel Monolith Samples
Aerogel Shape and Volume Observation:

Although the aerogel monolith sample produced as a particular embodiment of the present invention has a smaller volume and diameter than that of the corresponding alcogel (with about 5%-40% shrinkage), it maintains its regular shape without any crack after ethanol supercritical drying and subsequent calcination, indicating that the process of the present invention enables preparation of crack-free $TiO_2$—$SiO_2$ aerogel monolith.

X-ray Diffraction Analysis:

The aerogel monolith sample was ground and shifted to produce a fine powder. The powder was placed in an aluminum holder, which is then placed in the sample holder of the X-ray diffractometer. A $CuK\alpha$ X-ray source was used and the X-ray diffraction was recorded for $20°<2\theta<60°$ by step-scanning at $0.05°$ increments.

Figure 2:
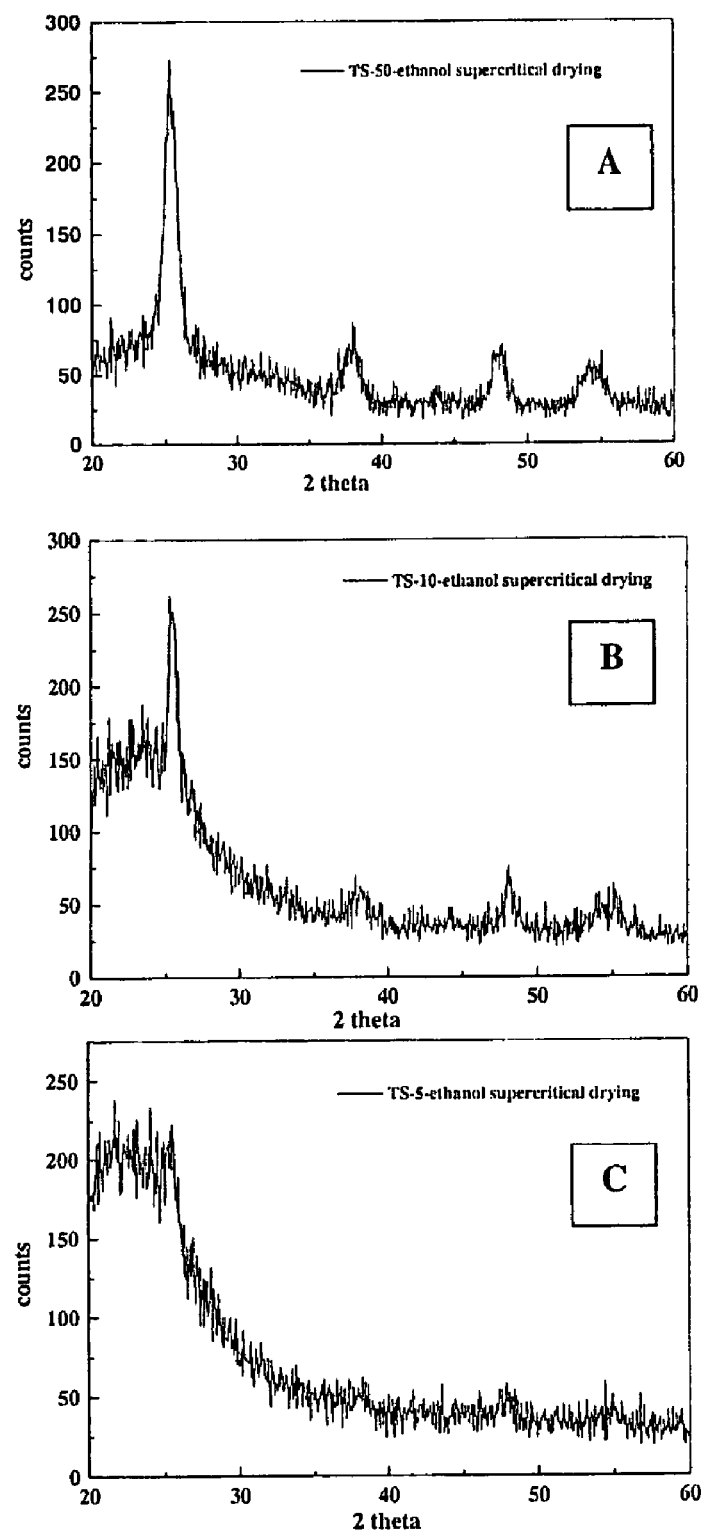
FIG. 2 is the XRD results of $TiO_2$—$SiO_2$ aerogels with titania content of (a) 50 wt %, (b) 10 wt %, and (c) 5 wt % after ethanol supercritical drying.
Figure 3:
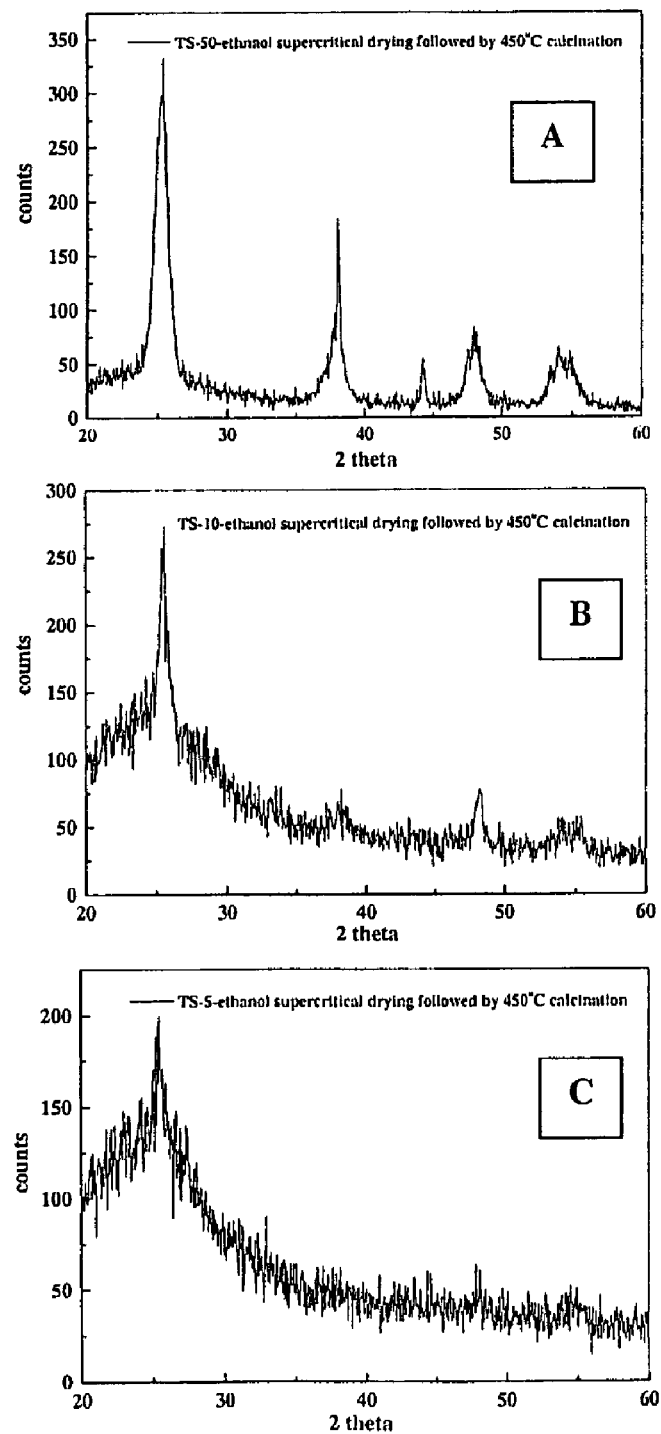
FIG. 3 is the XRD results of $TiO_2$—$SiO_2$ aerogels with titania content of (a) 50 wt %, (b) 10 wt %, and (c) 5 wt % after ethanol supercritical drying and followed by 450° C. calcination.
Figure 4:
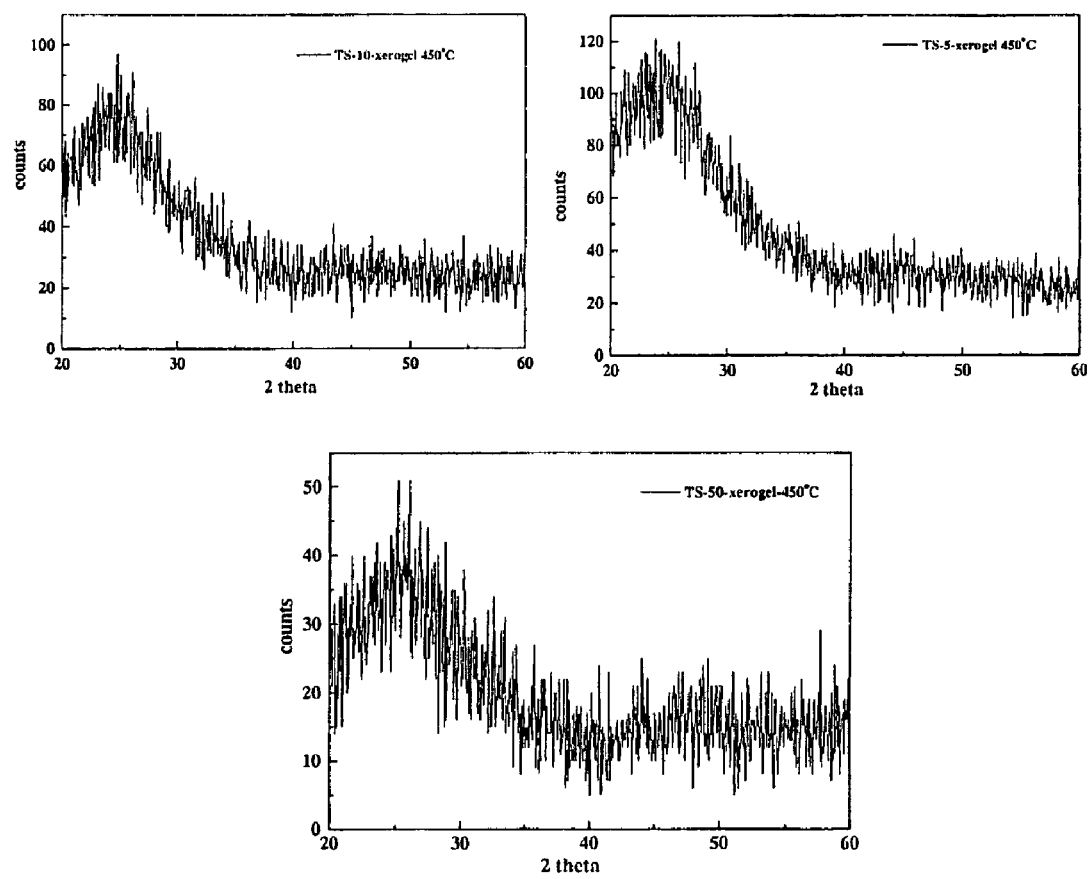
FIG. 4 is the XRD pictures of titania-silica samples prepared by the direct calcination method.

As shown in FIG. 2, the samples gave the characteristic diffraction of anatase which peaks at $2\theta$ values around $25°$, $38°$, $47°$ and $54°$ for every sample, and the intensity o anatase diffraction peak drops gradually with the increasing of the $SiO_2$ content. In the case of TS-5 aerogel sample (with 5% titania content), only a small anatase diffraction peak can be observed. After calcination at $450°$ C., the aerogel monolith samples (shown in FIG. 3) exhibit sharper anatase peaks as compared to those un-calcined ones (shown in FIG. 2). Comparatively, $TiO_2$—$SiO_2$ samples prepared by direct calcination method without pre-supercritical drying only show amorphous crystal phase (shown in FIG. 4). These results mean that ethanol supercritical drying process enables the production of nano-sized anatase crystals in the $SiO_2$ network. This effect can not be achieved with the $CO_2$ supercritical drying procedure.

BET Surface Area Measurement:

The BET surface area and pore volume of the aerogel are measured by nitrogen physisorption. The capped quartz tube sample holder from Coulter SA 3 1 00 nitrogen physisorption apparatus was weighted. About 0.1 gram of the aerogel powder was measured and placed inside the quartz tube sample holder. The capped quartz tube sample holder (with the sample) was weighed again. The holder was then connected to the out-gassing port of the Coulter SA 3100. The sample was outgassed at a desired temperature at $250°$ C. for 2 hours. After outgassing and nitrogen physisorption conducted at 77 K, the capped quartz tube sample holder (with outgassed sample) was weighted again to calculate the physisorption data, from which the BET surface area and pore volume were obtained.

Table 1 summaries the results of nitrogen sorption analysis of $TiO_2$—$SiO_2$ samples prepared by different methods. The aerogels prepared with supercritical drying and calcination at both temperatures, have larger specific surface areas and pore volumes. The macropore appears when the titania content attains 50 wt % in the aerogel series. Addition of surfactant in the aerogel has positive effect on the sample's pore volume and BET surface area. Comparatively, normal preparation method (i.e. direct calcination) can only produce microporous materials. The results indicate that the ethanol supercritical drying process affects not only the crystal phase, but also the pore geometry.

TABLE 1

BET characterization results

| Sample No. | $TiO_2$ (wt %) | Synthesis conditions (° C.) | Specific surface area ($m^2/g$) | Pore Volume (cc/g) | Pore type |
|---|---|---|---|---|---|
| TS-5 | 5 | ESD-450 | 884.457 | 1.2815 | Mesopore |
| TS-10 | 10 | ESD-450 | 741.116 | 1.0358 | Mesopore |
| TS-50 | 50 | ESD-450 | 428.098 | 0.6984 | Mesopore, Maropore |
| TS-50-P* | 50 | ESD-450 | 526.669 | 1.0195 | Mesopore, Maropore |
| TS-10-P* | 10 | ESD-550 | 643.493 | 2.4497 | Mesopore |
| TS-5-P* | 5 | ESD-550 | 889.983 | 2.12 | Mesopore |
| TS-50-N** | 50 | 450° C. | 286.062 | 0.092 | Micropore |
| TS-10-N** | 10 | 450° C. | 468.771 | 0.171 | Micropore |
| TS-5-N** | 5 | 450° C. | 452.018 | 0.174 | Micropore |

ESD-450: Ethanol supercritical drying and 450° C. calcination
ESD-550: Ethanol supercritical drying and 550° C. calcination
*surfactant incorporated aerogel sample.
**Xerogel sample produced via normal preparation method (i.e. direct calcination)
TS-5, TS-10 and TS-50 aerogel samples contain 5%, 10%, 50% of $TiO_2$ by weight in the final dried monolith, respectively.

Fourier Transform Infrared Spectroscopic Analysis:

About 10 mg of potassium bromide (reference sample) was placed on the sample holder of a diffuse reflectance infrared Fourier transform spectroscopic (DRIFTS) cell. The cell was positioned in a Praying Mantis mirror assembly (Harrick) and placed in the Perkin Elmer Spectrum GX FTIR (Fourier Transformation Infrared Spectroscope). The chamber of the FTIR was purged with dry, carbon dioxide free air until the signal stabilized in about 15 minutes. Reflectant mode of the FTIR was used to observe the background signal.

Figure 5:
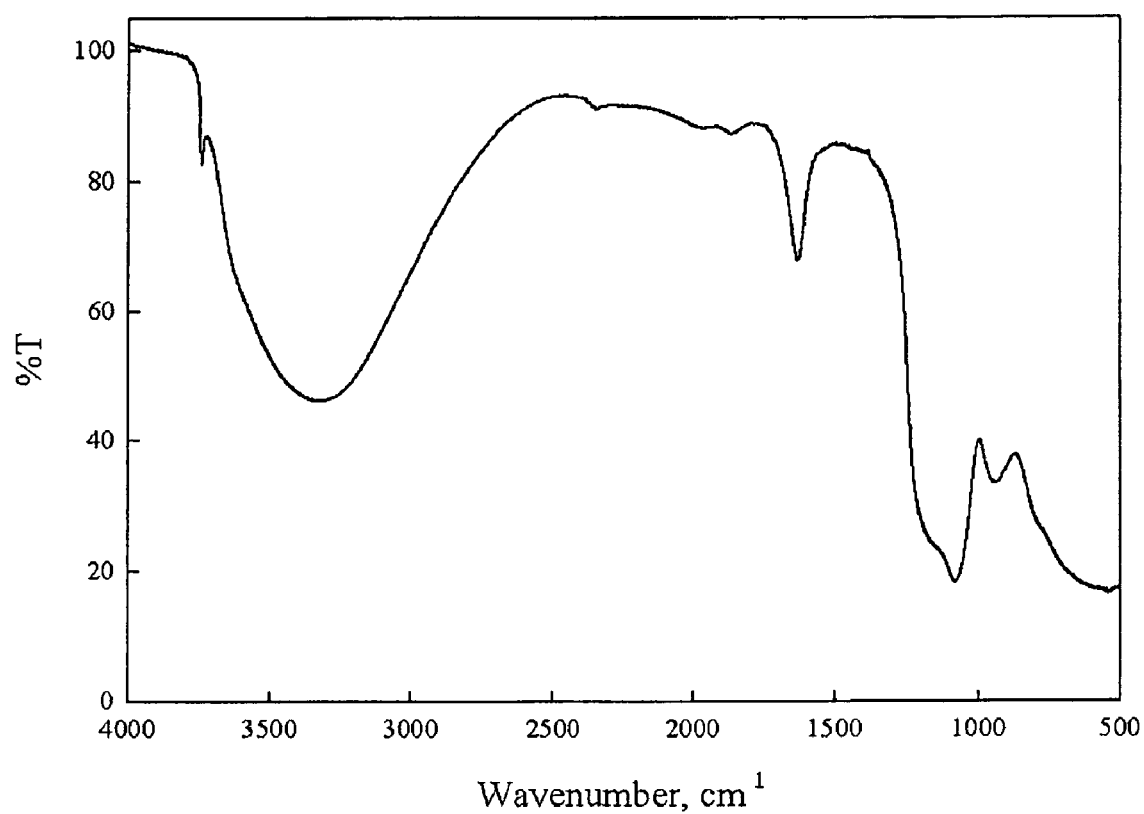
FIG. 5 is an FT-IR spectrum of $TiO_2$—$SiO_2$ aerogel monolith sample.

Using the same procedure as described above in connection with the reference sample, approximately 0.05 g aerogel sample was used with the FTIR to record the spectrum at room temperature. The aerogel sample was scanned from 450 $cm^{-1}$ to 4000 $cm^{-1}$ at a resolution of 1 $cm^{-1}$ and 256 scans were collected. FIG. 5 shows the FT-IR spectrum of $TiO_2$—$SiO_2$ aerogel monolith. The peak located at 960 $cm^{-1}$ ascribing to Ti—O—Si bond, which can be observed after ethanol supercritical drying.

Figure 6:
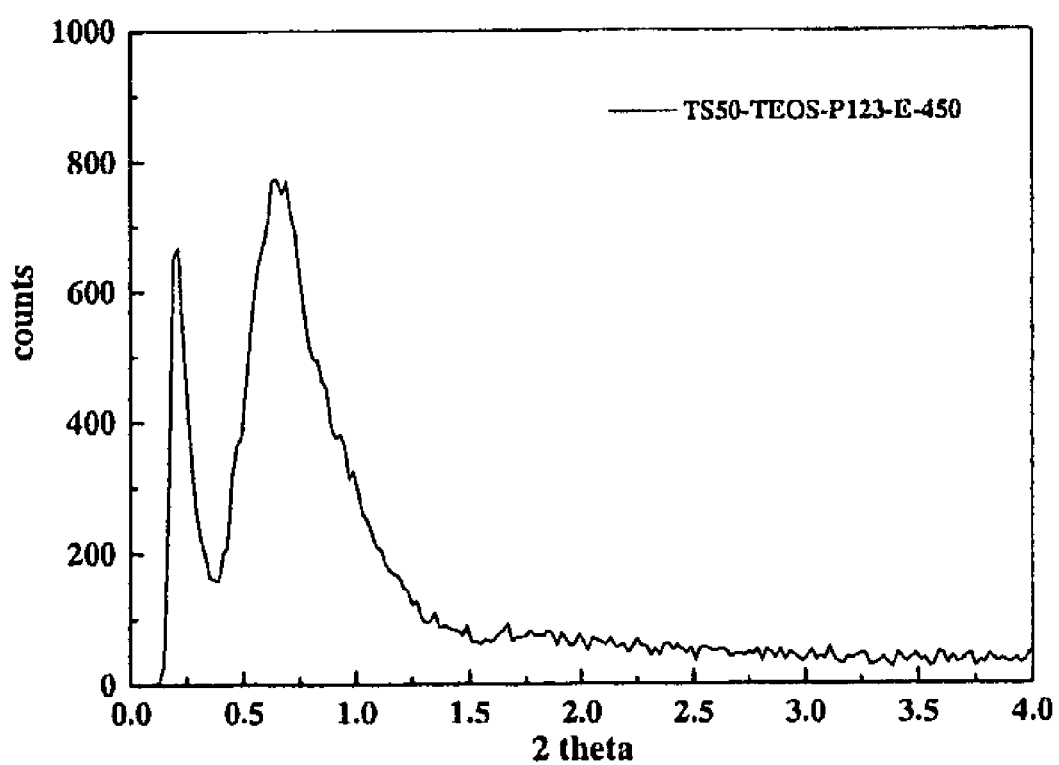
FIG. 6 is an XRD result of surfactant incorporated TS-50 aerogel monolith.
Figure 7:
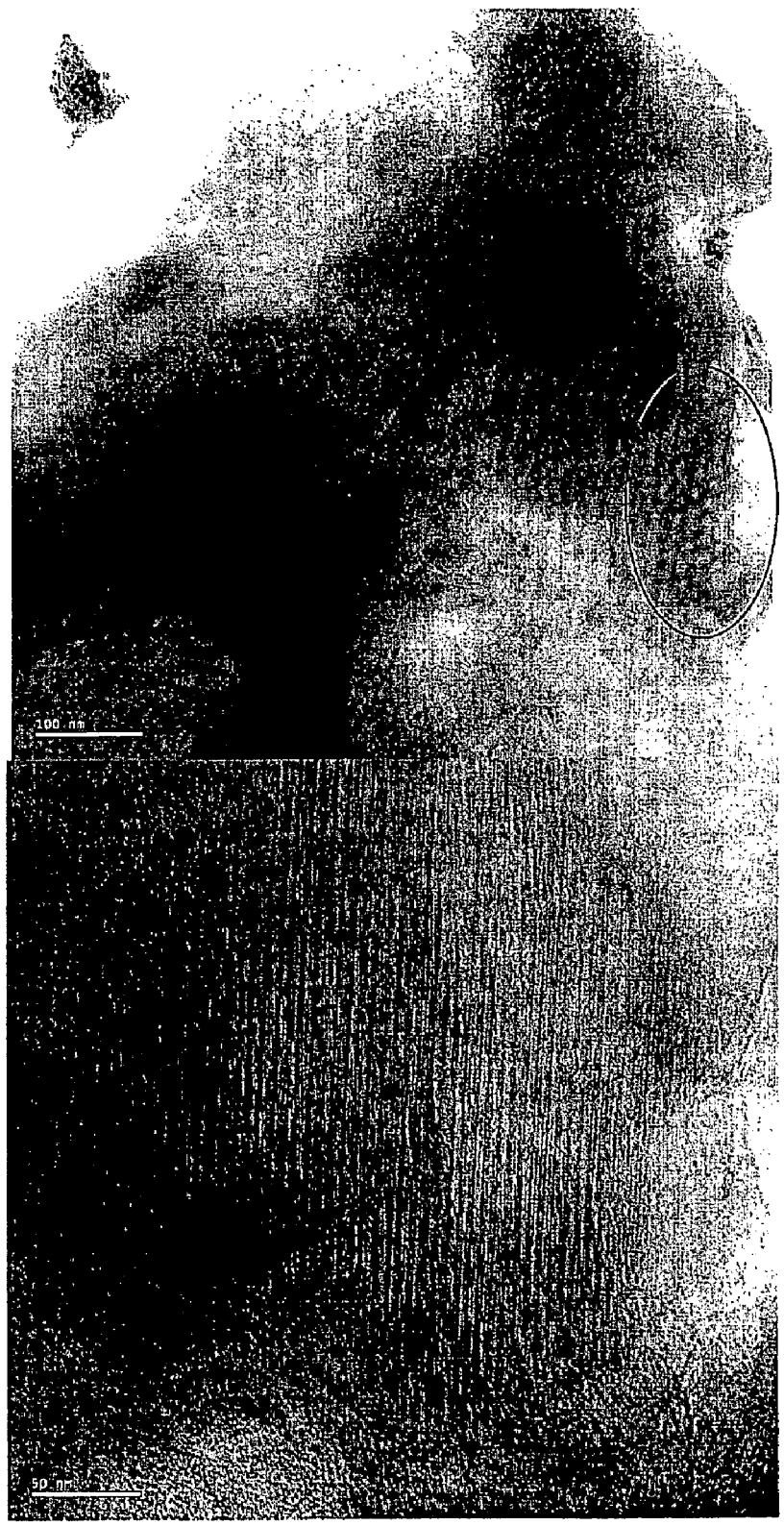
FIG. 7 is a TEM image of surfactant incorporated TS-50 aerogel monolith.
Figure 8:
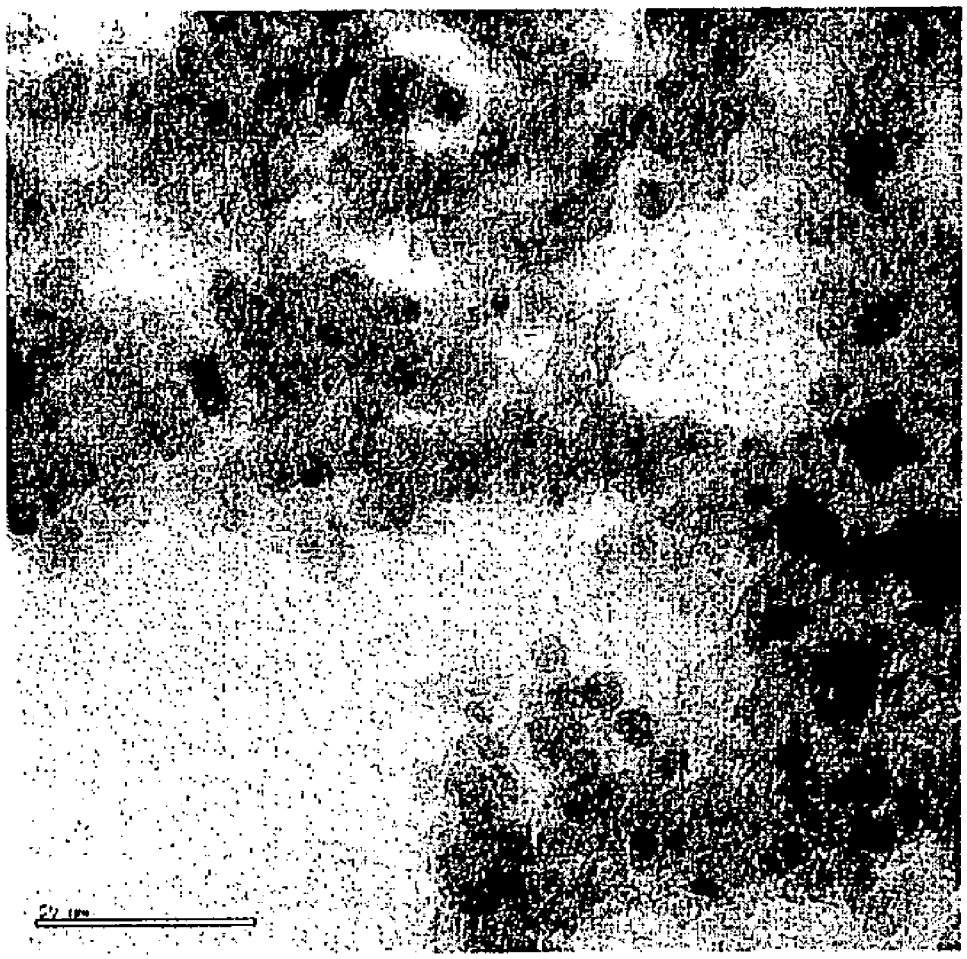
FIG. 8 is a TEM image of surfactant-free TS-50 aerogel monolith.

FIG. 6 and FIG. 7 are the small angle XRD result and TEM photo of surfactant incorporated TS-50 aerogel monolith, respectively. As seen in FIG. 7, the TEM photo shows well-ordered hexagonal arrays of mesopores. This result is confirmed by small angle XRD analysis (see FIG. 6) which shows a diffraction peak at around 0.8 degree ascribing to ordered hexagonal pore arrangement with (100) orientation. By comparison, the TEM photo of surfactant-free aerogel monolith, seen in FIG. 8, only shows nano-sized particles rather than ordered pore geometry.

The Catalytic Activity of the $TiO_2$—$SiO_2$ Aerogel Monolith

Figure 9:
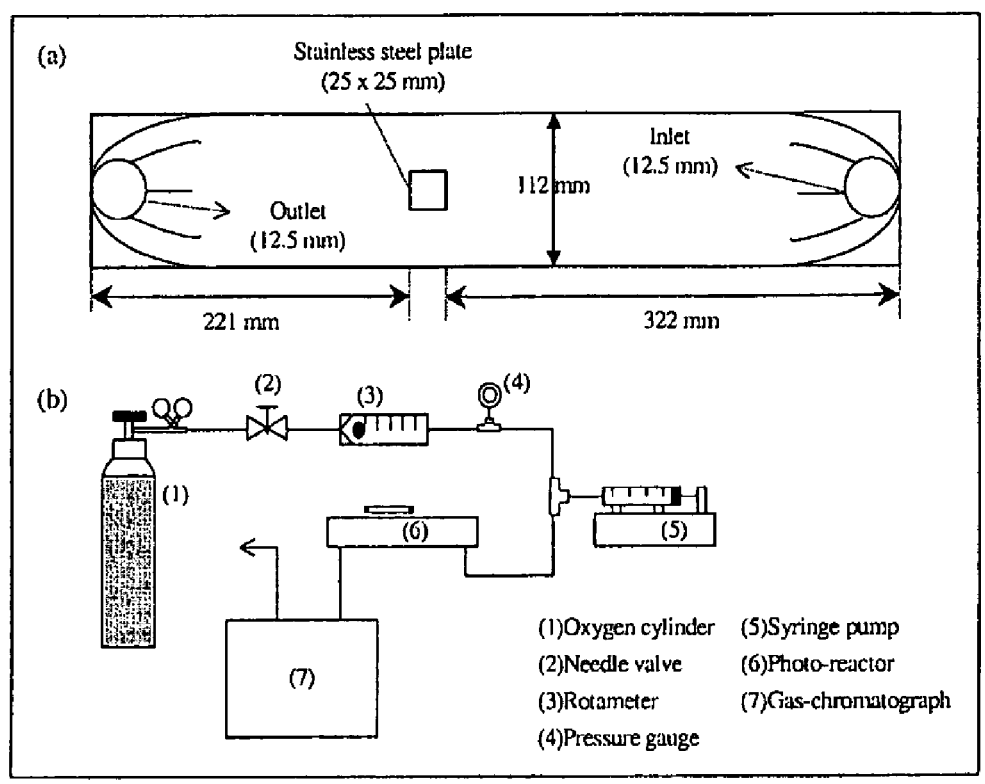
FIG. 9 is a schematic diagram of the photoreactor and the test setup.

Photocatalytic oxidation reaction catalyzed by $TiO_2$—$SiO_2$ aerogel monolith was analyzed in a flow reactor. As shown in FIG. 9, the flat, rectangular photo-reactor had dimensions of 578 mm×113 mm. The stainless steel reactor has the inlet and outlet ports, a recess for the catalyst plate and two sets of machined baffles. A 6.25 mm thick Pyrex glass cover completes the reactor assembly. The Pyrex glass window and the stainless steel reactor form a narrow rectangular channel (2 mm deep×112 mm wide) for gas flow.

Liquid VOC (Volatile organic compounds) was delivered to a constant temperature heat exchanger using a syringe pump 5 (kdScientific 1000) and mixed with synthetic air before entering the reactor 6. The $TiO_2$—$SiO_2$ aerogel monolith (diameter: 12 mm, weight: 0.137 g) was on the stainless steel plate located 322 mm downstream from the inlet port (gas entrance). In a typical experiment, a metered amount of the VOC vapor (0.01 ml/h) was mixed with pure synthetic air with flow rate at 400 ml/min before entering the reactor. After the feed concentration attained equilibrium, the aerogel monolith was illuminated by five fluorescent black lamps (365 nm, 6 W) located 10 mm above reactor's window.

The gases from the outlet port were separated using a GS-Gaspro capillary column and analyzed using a gas chromatograph (HP 6890) equipped with thermal conductivity and flame ionization detectors. The gases used in the GC were helium (UHP, CW), hydrogen (UHP, HKO) and synthetic air (HP, HKSP).

The catalytic activity of the $TiO_2$—$SiO_2$ aerogel monolith sample prepared according to the previous section under "VIII. Basic synthesis of $TiO_2$—$SiO_2$ aerogels by ethanol supercritical drying" was investigated using gas-phase trichloroethylene (TCE) and Isopropanol (IPA) as probe molecules, respectively. Table 2 shows the photocatalytic degradation results. It indicates that the $TiO_2$—$SiO_2$ aerogel monolith is capable of degradation of VOCs under the UV illumination condition.

TABLE 2

Photocatalytic degradation testing results

| Catalyst | TCE removal efficiency % | IPA removal efficiency % |
|---|---|---|
| Titania-silica aerogel monolith | 10 | 27 |

Dry air flow rate: 400 ml/min (for TCE) and 200 ml/min (for IPA)
TCE inlet concentration: 113 ppm
Isopropanol inlet concentration: 268 ppm While there have been described and pointed out fundamental novel features of the invention as applied to a preferred embodiment thereof, it will be understood that various omissions and substitutions and changes, in the form and details of the embodiments illustrated, may be made by those skilled in the art without departing from the spirit of the invention.

What is claimed is:

1. A $TiO_2$—$SiO_2$ aerogel monolith, comprising:
   at least 0.1% w/w of titania;
   a regular shaped $TiO_2$—$SiO_2$ aerogel monolith; and
   a Ti—O—Si bond in said aerogel,
   wherein said bond has an absorption peak around 960 cm$^{-1}$ in an infrared spectrum.

2. The $TiO_2$—$SiO_2$ aerogel monolith of claim 1, further comprising an ordered mesoporosity with a pore diameter range of 2-50 nm and where at least 10% of said titania is in the form of titanium dioxide crystals.

3. The $TiO_2$—$SiO_2$ aerogel monolith of claim 2, wherein said regular shape is sphere, pyramid cube, elongated cube, cylinder, sheet or supported film with a thickness.

4. The $TiO_2$—$SiO_2$ aerogel monolith of claim 2, wherein said regular shape is a block with a plurality of flat or curved sides.

5. The $TiO_2$—$SiO_2$ aerogel monolith of claim 2, wherein said titanium dioxide crystals have a size between about 3 nm and about 25 nm and a crystallinity greater than 70%.

6. The $TiO_2$—$SiO_2$ aerogel monolith of claim 2, wherein said titania accounts for 1%-99% by weight and at least 30%-50% of said titania is in the form of titanium dioxide crystals.

7. The $TiO_2$—$SiO_2$ aerogel monolith of claim 2, wherein said aerogel has a specific surface area greater than 400 m$^2$/g and a pore volume larger than 0.5 cc/g.

8. The $TiO_2$—$SiO_2$ aerogel monolith of claim 6, wherein at least 65% of said titanium dioxide crystals are selected from the group consisting of anatase, brookite and rutile.

9. A process of fabricating a $TiO_2$—$SiO_2$ aerogel monolith, comprising the steps of
   (a) forming a titanium dioxide sol with particle size of about 3 nm-25 nm;
   (b) forming a silica sol with particle size of about 3 nm-25 nm;
   (c) adding one or more surfactants to said silica sol to form a mixture where said surfactant or surfactants account for 50%-70% by weight;
   (d) mixing said titanium dioxide sol with said mixture of step (c) to afford a homogenous $TiO_2$—$SiO_2$ sol;
   (e) transferring an amount of said $TiO_2$—$SiO_2$ sol into a mold;
   (f) allowing said $TiO_2$—$SiO_2$ sol to undergo a gelation process to afford an alcogel; and
   (g) drying said alcogel under ethanol supercritical conditions to afford an aerogel.

10. The process of claim 9, wherein said aerogel is further calcined to afford a final $TiO_2$—$SiO_2$ aerogel monolith.

11. The process of claim 10, wherein said titanium dioxide sol is prepared by hydrolyzing a titanium dioxide precursor in the presence of alcohol and water and then peptizing using a first acid.

12. The process of claim 11, wherein said silica sol is prepared by hydrolyzing a silica precursor in the presence of alcohol and water and then peptizing using a second acid.

13. The process of claim 12, wherein said first acid and second acid are independently selected from the group consisting of $HNO_3$, $H_2SO_4$, HCL and $H_3PO_4$.

14. The process of claim 12, wherein said silica precursor is tetraethyl orthosilicate or tetramethyl orthosilicate.

15. The process of claim 9, wherein said titanium dioxide sol is prepared by using an organic modifier added to a titanium dioxide precursor.

16. The process of claim 15, wherein said organic modifier is ketone and the molar ratio between titanium dioxide and ketone is from 1:10 to 10:1.

17. The process of claim 9, wherein said surfactant or surfactants are one or more members selected from the group consisting of long chain organic ammonium salt, amphiphilic block copolymer, cetyltrimethyl ammonium salt, and poly (ethylene oxide)-poly(propylene oxide)-poly(ethylene oxide).

18. The process of claim 9, wherein said surfactant or surfactants are a mixture of poly(ethylene oxide)-poly(propylene oxide) -poly(ethylene oxide) with ethylene oxide and propylene oxide.

19. The process of claim 9, wherein said surfactant is cetyltrimethyl ammonium bromide.

20. A method of increasing a chemical reaction, comprising using a $TiO_2$—$SiO_2$ aerogel of claim 1 as a catalyst.

* * * * *